Dec. 3, 1935.                    J. DUNLOP                    2,023,067
                              MOVING STAIRWAY
                          Filed Dec. 18, 1934            2 Sheets-Sheet 1
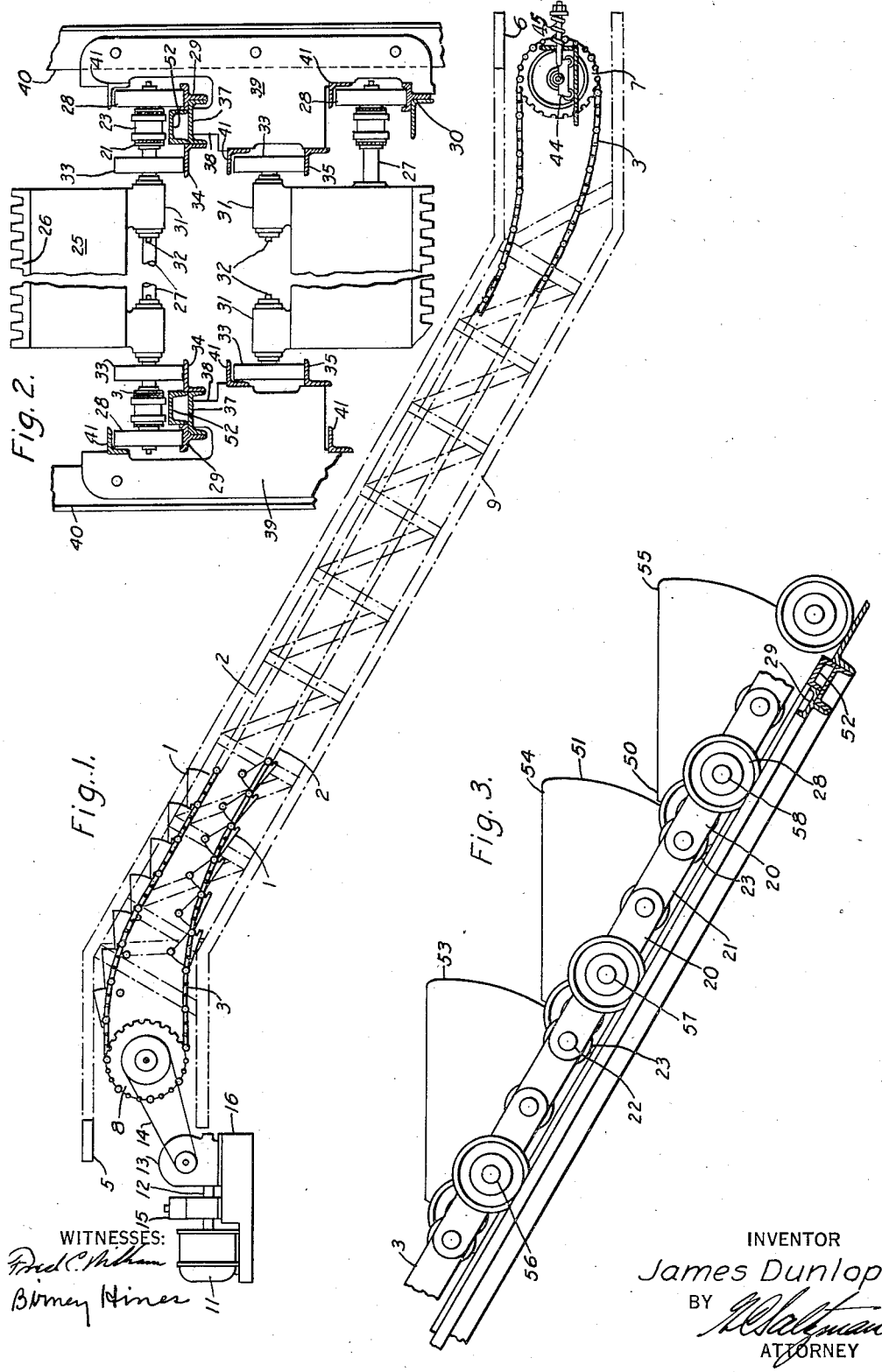
INVENTOR
James Dunlop
BY
ATTORNEY Dec. 3, 1935.  J. DUNLOP  2,023,067
MOVING STAIRWAY
Filed Dec. 18, 1934  2 Sheets-Sheet 2
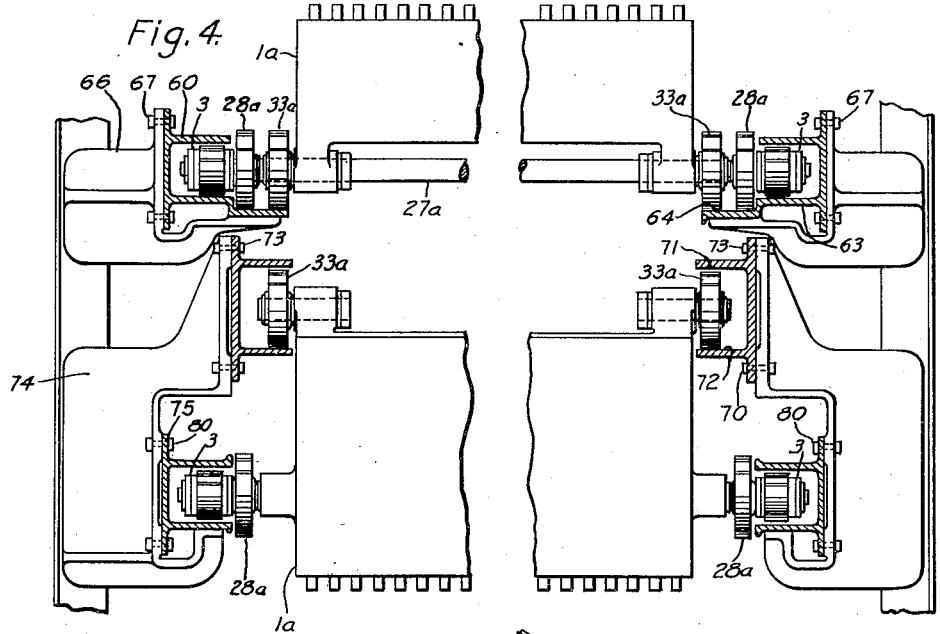
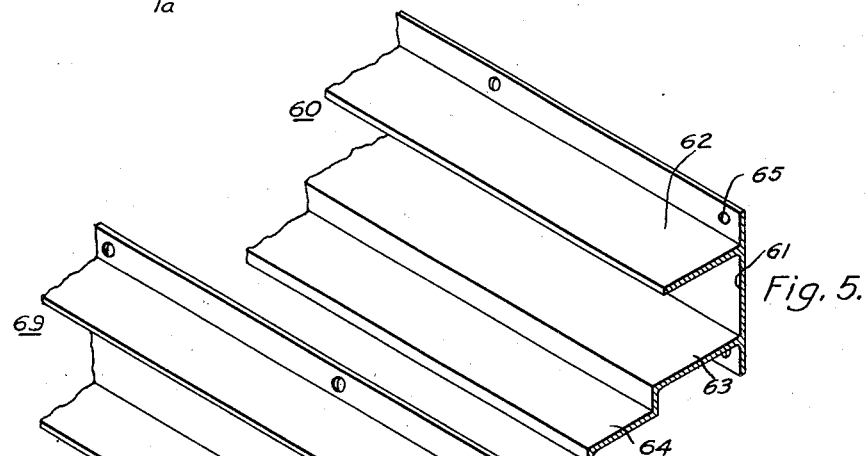
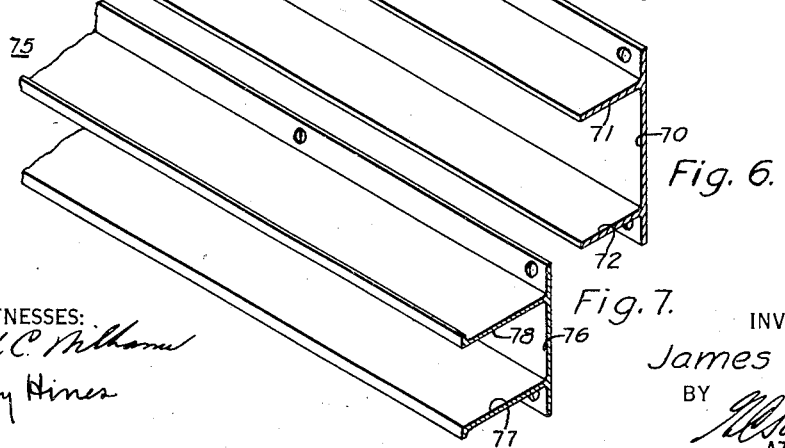
WITNESSES:
Fred C. Williams
Olney Hines
INVENTOR
James Dunlop
BY
ATTORNEY Patented Dec. 3, 1935

2,023,067

UNITED STATES PATENT OFFICE 2,023,067

MOVING STAIRWAY

James Dunlop, Park Ridge, Ill., assignor to Westinghouse Electric Elevator Company, Chicago, Ill., a corporation of Illinois Application December 18, 1934, Serial No. 758,037

8 Claims. (Cl. 198—16)

My invention relates to moving stairways in which the steps are operated by endless gear chains.

One object of my invention is to reduce the amount of noise and vibration usually incident to the operation of moving stairways.

Another object of my invention is to limit the sag or drop in the operating gear chains of moving stairways to a predetermined distance and to prevent the steps from jamming into each other during their operation.

Other objects of the invention will be apparent from the following description in conjunction with the accompanying drawings, in which:

Figure 1 is a skeleton-like view in side elevation of a moving stairway constructed in accordance with my invention;

Fig. 2 represents an enlarged lateral cross-section view of the tracks and supporting means for the stairway steps;

Fig. 3 is an enlarged view, in side elevation, of three of the steps and a portion of the upper track illustrated in Fig. 1;

Fig. 4 is a view in lateral cross-section of a modified form of my invention in which the leading rollers are mounted between the chains and the steps, and the tracks and guard members are constructed of solid extruded metal;

Fig. 5 is a view in perspective of one of the upper rails in Fig. 4;

Fig. 6 is a view in perspective of one of the lower side rails for the trailing step rollers in Fig. 4; and, Fig. 7 is a view in perspective of one of the lower side rails for the chains in Fig. 4.

Referring more particularly to the drawings, I have illustrated a moving stairway as comprising an endless series of movable steps 1 disposed to be moved along their tracks 2 by a pair of gear chains 3 between an upper landing 5 and a lower landing 6. The gear chains are supported at the lower landing and at the upper landing by suitable sprocket wheels 7 and 8. A suitable truss or frame 9 of structural steel may be provided for supporting the moving steps between the upper landing and the lower landing.

The sprocket wheels 8 may be driven in any desired manner, as by a motor 11, through a shaft 12, a reduction gear 13 and a driving chain 14. An electromagnetic brake 15 is provided for applying a braking force to the driving shaft 12 in stopping the stairway. The motor, brake and speed-reducing gear may be mounted upon a base plate 16.

Each of the chains for operating the steps comprises a plurality of inner links 20 and a plurality of outer links 21 connected by pivot pins 22. In order to increase the ease of operation of the chain, a roller 23 is disposed upon each of the pivot pins.

Each of the steps 1 comprises a frame 25 and a stair tread 26 mounted thereon. The front end of the frame is provided with an axle 27, the ends of which extend through hollow pivot pins in the chain into position to be supported by a leading roller 28 operating upon a track rail 29, while the step is running on the upper side of the stairway, and operating upon a track rail 30 when on the under side of the stairway. The rear portion of the step frame is provided with a projection 31 in which is mounted a stub axle 32 for a trailing roller 33. The trailing rollers run upon the track rail 34 while the step moves along the upper side of the stairway and along a track rail 35 while the step moves along the under side of the stairway.

The track rails 29 and 34 may be welded or otherwise secured to a channel iron 37 supported upon an upwardly projecting portion 38 of a bracket 39 securely fastened to an upright angle iron portion 40 of the truss 9. The lower track rails 30 and 35 may be welded or otherwise suitably secured to lower portions of the bracket 39, as indicated in Fig. 2. A suitable angle iron guard rail 41 may be mounted above each of the track rails 29, 30 and 35 and secured to the brackets 39 in position to prevent the step rollers from leaving the tracks.

In the foregoing construction, it will be seen that the steps will be moved along their tracks by reason of the front axles extending through the gear chains in such manner that any movement imparted to the gear chains will be imparted to the steps. It will also be apparent that the gear chains will be supported to a greater or less extent while between the upper and lower terminals by the leading step rollers following the track rails.

In order that the gear chains may be kept under suitable tension in the operation of the stairway, the lower sprocket wheels 7 are disposed upon movable trucks 44 which are biased outwardly against the pull of the gear chains by tensioning devices 45. The tension tends to reduce the weight of the chains on the step rollers and to keep the steps from bumping into each other.

In constructing and operating electric stairways, it is desirable to keep the openings between the moving parts on the upper face of the stairway as small as possible, particularly in connection with the tread surfaces of the stairway. For this reason, it is customary to so construct moving stairways that the nose or front portion of each step follows the riser of the next step very closely, it being obvious that open cracks around moving stairway steps are dangerous because of the likelihood of small objects rolling into such crevices and breaking the stairways, or even small shoe heels becoming wedged in such crevices.

Although the gear chains are kept under tension to a greater or less degree by the sprocket wheels and the tensioning devices 45, they sometimes sag or drop below their usual operating level. In order to prevent this sagging or dropping of the chains to such extent as to cause adjacent steps to jam together, that is, to cause the front portion 50 of one step to jam into the riser 51 of an adjacent step, I have provided a guard rail 52 to prevent the gear chain from dropping or sagging more than a small distance. The guard rail 52 is mounted upon the channel iron 37 and may be welded or otherwise suitably fastened thereto. Referring to Fig. 3, it will be seen that as long as the gear chain 3 retains its normal position of operation, it will be supported upon the front axles 56, 57 and 58 of the steps 53, 54 and 55 and its rollers 23 will not engage the chain guard rail 52. In this position, the forward portion 50 of the step 55 will be spaced from the riser portion of the step 54. However, it will also be apparent that if the chain sags, the links 20 and 21 will move downwardly out of a straight line with the axles 57 and 58, thereby shortening the distance between these axles and hence, causing the forward end 50 of the step 55 to approach the riser portion 51 of the step 54.

However, with my improvement, the chain guard rail 52 will prevent the links 20 and 21 from sagging to such a low point that the front end of the step 55 and the riser of the step 54 will be jammed together. Therefore, it will be apparent that the guard rail 52 will prevent the jamming of the steps and the consequent noise and damage. It will also be apparent that with my improvement, the gear chains will be prevented from undue sagging with the consequent jamming of the stairway steps, and the friction loss which would result if the gear chains were inflexibly supported, in moving from the lower landing to the upper landing, is avoided.

In the modified form of construction shown in Fig. 4, the front roller 28a is mounted on the front axle 27a in a position between the step 1a and the chain 3. Hence, in this construction, the gear chains are disposed on the outer ends of the axles 27a and outside of both the leading rollers and the trailing rollers. A novel means for preventing undue sagging of the chains and for supporting and guiding the trailing rollers 33a and the leading rollers 28a comprises a single rail 60 of extruded metal, such as aluminum, for the chain and for the step rollers, on each side of the steps as they travel along the upper side of the stairway.

As shown in Fig. 5, the rail 60 is constructed of a solid piece of extruded metal having a base portion 61, a laterally extending guide portion 62, a laterally extending guide portion or web 63 constituting a sag-limiting surface, and a step roller track surface or web 64. The base portion 61 of the rail is provided with a plurality of bolt holes 65 by means of which it may be secured to the rail supporting bracket 66 by a plurality of bolts 67, as shown in Fig. 4.

By referring to Fig. 4, it will be seen that the leading rollers 28a and the trailing rollers 33a run along the track surface 64 when the steps are operating on the upper side of the stairway and that the gear chain 3 passes between the chain guard web 62 and the sag-limiting web 63. Hence, it will be apparent that if any undue sag occurs in that section of chain 3 passing along the upper side of the stairway while it is in operation, the web 63 will limit the sagging to such a predetermined distance that the distance between the step axles of any two adjacent steps will not be decreased to such an extent that the riser of one step will strike the following step. It will also be apparent from the drawings that chain guard web 62 disposed a short distance above the chain will prevent upward buckling of the chain and assist in guarding and guiding the chain in its movements along the stairway. It will also be apparent that the solid and substantial construction obtained by the use of a long rail of solid extruded metal will provide smooth and uniform guarding and tracking surfaces for the chain rollers and the step rollers and thereby decrease the amount of noise usually found in moving stairways in which the tracks are built up of rolled metal strips.

The guide for the trailing rollers 33a on the underside of the stairway for returning the out-of-service steps to their in-service position is a solid rail 69 of an extruded metal, preferably aluminum, having a base 70, a laterally extending guard web 71 and a track web 72. The rail 69 is secured in operative position by a plurality of bolts 73 which fasten it to the upper, inner portion of a bracket 74. As shown in Fig. 4, the trailing roller 33a normally rests upon the track web 72 in passing along the underside of the stairway and is guarded in that position by the guard web 71 disposed above it.

In the construction shown in Fig. 4, the leading step rollers 28a are not supported upon a track while the step is on the underside of the stairway and is hanging downwardly. However, the gear chains are provided with a rail 75 of extruded metal such as aluminum. This rail is provided with a base portion 76, a gear chain track web 77 and a gear chain guard web 78. The rail 75 is secured in position by fastening it to the bracket 74 by a plurality of bolts 80.

By reason of this modified form of construction, it is seen that I have provided not only a means for preventing jamming of the steps, but that I have provided improved rails for the chains and steps which will provide a more rigid construction and which will eliminate a considerable amount of the noise usually resulting from the operation of moving stairways.

Although I have illustrated and described only one specific embodiment of my invention and a modification thereof, it is to be understood that many changes and additional modifications may be made therein without departing from the spirit and scope of the invention.

I claim as my invention:

1. In a moving stairway, a series of movable steps, a plurality of rollers for supporting the steps, a track for the rollers, a gear chain for moving the steps along the track, means for applying a predetermined tension to the gear chain, and a guard rail disposed a short distance beneath the chain but out of engagement therewith to limit sagging of the chain beyond a predetermined distance.

2. In a moving stairway provided with an endless series of steps mounted upon a pair of gear chains, a pair of guard rails disposed a short distance beneath the upper sections of the gear chains but out of engagement therewith for the purpose of preventing the upper sections of the gear chains from sagging beyond a predetermined distance.

3. In a moving stairway, a series of movable steps, a plurality of rollers for supporting the steps, a track for supporting and guiding the step rollers, a gear chain for moving the steps along the track, said gear chain comprising a plurality of links and connecting pins with rollers rotatably mounted upon the connecting pins, means for applying tension to the gear chains, and a pair of guard rails disposed a predetermined distance underneath the upperside sections of the gear chains and normally out of engagement with the chain rollers whereby sagging of the upper sections of the gear chains beyond a predetermined amount will cause the rollers thereon to move into engagement with the guard rails and prevent further sagging.

4. In a moving stairway, a pair of gear chains, a pair of sprocket wheels at an upper terminal and a pair of sprocket wheels at a lower terminal for supporting and operating the gear chains, a series of movable steps, a plurality of axles affixed to the steps and having their end portions extending through the gear chains so that the steps will be operated along the stairway by the operation of the gear chains, a plurality of leading rollers mounted on the axles, a plurality of trailing rollers mounted on the steps, a plurality of tracks for the leading rollers and the trailing rollers, guard rails for the tracks of the leading rollers and guard rails disposed a predetermined distance below the sections of the gear chains on the upper side of the stairway but out of engagement with the gear chains to prevent the upper sections of the chains from sagging beyond a predetermined distance and thereby preventing the jamming of the front portions of the steps into the riser portions of steps ahead.

5. In a moving stairway, an endless series of moving steps, a pair of gear chains for operating the steps, a plurality of leading rollers and trailing rollers for each step, a pair of sprocket wheels at an upper landing and a pair of sprocket wheels at a lower landing for operating the gear chains, a rail for each side of the upper face of the stairway of extruded metal, said rail being disposed on the upper side of the stairway and having a track surface for the step rollers, an upper guard surface for maintaining the step rollers on the track and a chain guard surface disposed underneath the gear chain but normally out of engagement therewith to limit the downward sag of the upper sections of the gear chain to a predetermined distance and thereby prevent the jamming of the steps together upon sagging of the gear chains.

6. A rail for the upper side of a moving stairway comprising an extruded piece of metal having a track surface for the rollers of a moving stairway step, a sag-limiting surface for the gear chain of said stairway, and a guard surface for said gear chain.

7. A rail for the upper side of a moving stairway comprising an extruded piece of metal having a track surface disposed in one plane for the rollers of a moving stairway step, a sag-limiting surface disposed in a higher plane for the gear chain of said stairway, and a guard surface disposed in a still higher plane for said gear chain.

8. A rail for the upper side of a moving stairway comprising an extruded piece of metal having a guard surface for the gear chain of said stairway, a sag-limiting surface for said chain disposed below the guard, surface, and a track surface for the rollers of the stairway, said track surface depending from the outer edge of said sag-limiting surface and being disposed in a plane below the plane of the sag-limiting surface.

JAMES DUNLOP.